United States Patent [19]

Micheletto

[11] 4,435,640
[45] Mar. 6, 1984

[54] MULTIFUNCTIONAL INSTRUMENT FOR DETERMINING THE POSITION AND COURSE OF THE SUN, THE INCLINATION FOR MAXIMAL INSOLATION OF A PLANE AND THE CORRESPONDENCE FROM SOLAR AND CONVENTIONAL TIME

[76] Inventor: Renato Micheletto, Via Asiago 34, Conegliano, Italy

[21] Appl. No.: 361,962

[22] Filed: Mar. 25, 1982

[30] Foreign Application Priority Data

Apr. 21, 1981 [IT] Italy .............................. 35763/81[U]

[51] Int. Cl.³ .............................................. G06C 3/00
[52] U.S. Cl. ................................ 235/78 M; 235/88 M
[58] Field of Search .......................... 235/78 R–78 N, 235/85 R, 88 R–88 N, 89 R, 61 B, 61 NV

[56] References Cited

U.S. PATENT DOCUMENTS 3,971,915  7/1976  Fletcher et al. .............. 235/88 M X Primary Examiner—Benjamin R. Fuller
Attorney, Agent, or Firm—Wenderoth, Lind & Ponack

[57] ABSTRACT

An instrument includes three surfaces arranged in contact with one another and rotating around a common coaxial center. By appropriate reciprocal rotations of the three surfaces, it is possible to determine, directly and simultaneously, at any latitude and longitude and during the entire course of the year, at the various solar times, the time of sunrise and sunset, the altitude and azimuth angles of the sun, the points to trace daily trajectories of the sun, the optimum inclination of a plane placed in a North-South direction to enjoy maximum insolation within a predetermined time period, as well as the correspondence between the actual solar time and the conventional time of the selected site. The instrument makes possible a rapid and direct determination of these values without having to resort to various tables or to analytical calculus.

7 Claims, 10 Drawing Figures

MULTIFUNCTIONAL INSTRUMENT FOR DETERMINING THE POSITION AND COURSE OF THE SUN, THE INCLINATION FOR MAXIMAL INSOLATION OF A PLANE AND THE CORRESPONDENCE FROM SOLAR AND CONVENTIONAL TIME

BACKGROUND OF THE INVENTION

In urban planning and building design it is necessary to take into account the trajectories of the sun in order to achieve adequate and appropriate planning of urban expansion, and particularly to consider the location, relative to vegetation and nearby buildings, of the individual buildings on the ground, their shape, as well as the position and size of the elements involved in the temperature control process of the building (perimeter walls, outside openings, roof, balconies, projections, etc.). Especially, since it has been realized that conventional energy sources are exhaustible, and their use is more expensive, it is essential to be able to make use of maximum insolation during cold periods and to obtain protection by means of adequate shading during hot periods.

Furthermore, in the study and applications of solar energy, in order to obtain maximum efficiency, it is necessary to know the position of the sun at any time, to orient the parabolic collectors, as well as the optimum inclination in a predetermined period, to position the solar panels.

It is also desirable to relate the data supplied to the times indicated by the clock, in order to facilitate practical operations and to perform any checks.

The major astronomical institutes publish tables which show the angles of position of the sun as a function of latitude, solar declination and time angle; the table for 40° North latitude is published in "L'Architettura dell'evoluzione" (The Architecture of Evolution), by S. Los and N. Pulitzer, Ediz. Luigi Parma, Bologna, p. 446. It is possible to calculate analytically, again as a function of latitude, solar declination and time, the altitude angle and the azimuth angle of the sun. The procedure is described in "L'energia solare nella costruzione" (Solar energy in building), by C. Chauliagnet, Ediz. C.E.L.I., Bologna, p. 26-27. There are also solar charts which show the course of the sun, on a given day and for a given latitude. "L'enciclopedia pratica per progettare e costruire" (The practical encyclopedia for design and building), by E. Neufert—Editore Hoepli, Milan, p. 123-124, shows the solar charts for Rome on the solstice and equinox days; "but (writes Neufert)—by changing the day, as well as by changing the latitude, the course of the sun changes, and, consequently, the solar charts must be different".

"L'energia solare nelle applicazioni termiche"(Solar energy is thermal applications), by J. A. Duffie and W. A. Beckmann, Liguori Editore, p. 64, also shows a nomogram to determine, by a series of successive readings, the time of sunset and the length of the day.

Because of the difficulty of their application, lack of data generally, or lack of specific data particularly, these methods do not fulfill the requirements of the user, who is forced to resort to several tables of information, or to obtain analytically the necessary data, especially when they are related to observation points of different latitude and longitude.

SUMMARY OF THE INVENTION

The purpose of this invention, therefore, is to remedy the shortcomings and inadequacies described above, by building an instrument capable of providing, directly and practically simultaneously, for any latitude and longitude and during the entire course of the year, at the various solar times, all the required data, such as, specifically, the time of sunrise and sunset, the altitude and azimuth angles of the sun, the points to trace the daily trajectories of the sun, and the optimum inclination of a plane (e.g., solar panel) placed in a North-South direction to enjoy maximum insolation within a predetermined time period.

The invention accomplishes this task by building an instrument composed of three surfaces with a common center and rotating in contact with one another, and specifically:

a first fixed surface, on which are shown concentrically:

(a) on an upper semicircle, straight and parallel lines showing altitude angular values and elliptical lines intersecting the straight and parallel lines and showing aximuth angular values;

(b) on a lower semicircle, the orthogonal projection of the straight lines and of the elliptical lines;

(c) along a lower semicircumference, South and North latitude values;

(d) along a ring, values related to daily time fractions;

(e) on a circle sector, East-West longitude values;

a second centered surface, mounted to rotate freely in the center of the first surface, of circular shape and transparent, which shows the solar orbits and the references related to equinoxes, solstices and days of the year intermediate among them, by means of parallel lines intersected by curved lines showing, in turn, the solar times of the day, arranged symmetrically on both sides of the median line showing the time for 0600–1800 hours;

a third surface, also transparent, rotating on top of the second, which keeps it in contact with and superimposed on the first surface, showing a ring which indicates the same daily time fractions shown on the first ring on the first fixed surface, and a curve which represents the time equation over the course of the year.

The basic concept of the invention is based on postulates which are set forth below for a better understanding of the combined graphic displays of which the invention makes use to build the instrument.

The Earth revolves around the sun along a slightly elliptical trajectory. Furthermore, the Earth rotates around its own axis. On the solstice days (June 22 and December 22), the normal to the plane containing the earth trajectory and the axis of the Earth form an angle, called solar declination, of 23°27′ (+23°27′ on June 22, −23°27′ on December 22). The axis of the Earth, in its revolution around the sun, always remains parallel in its various positions. On the equinox days (March 21 and September 23), on which, all over the Earth, the night lasts twelve hours, as long as the day, the effect caused by the solar declination angle is eliminated.

Any point on the Earth can be identified by its latitude (angular distance from the equatorial circle) and its longitude (angular distance from the meridian of origin, or reference meridian).

On the equinox days, the maximum angular altitude He of the sun above the horizon, with reference to the local meridian, is complementary to the latitude angle L ($He=90°-L$), and this applies to all points on the Earth. On the solstice days, the maximum angular altitude Hs of the Sun above the horizon is equal to the complementary angle to the latitude ±23°27' ($Hs=90°-L+23°27'$ on June 22; $Hs=90°-L-23°27'$ on December 22). This applies to the northern hemisphere, up to the highest latitude of 90°, at which, for the southern hemisphere, the algebraic signs are inverted.

As stated above, on these postulates are based the graphic diagrams appearing on the parts of the instrument according to the invention, which, appropriately manipulated in reciprocal combination, make possible the reading of all the values needed by the user, as described above.

The advantages that are obtained with the instrument according to the present invention result from the fact that this instrument makes it possible to determine all the data related to and following from the position of the sun relative to any latitude on the Earth, and to relate, at any longitude, solar time to the time indicated by the clock. In addition to its technical purposes, the instrument is useful to anybody who wishes to become conscious of the changes in the position of the sun to appreciate the innumerable and basic consequences which such changes entail for the surface of the Earth.

BRIEF DESCRIPTION OF THE DRAWINGS

The invention will now be described with reference to a preferred embodiment, as an example and without limiting the scope of the invention, with reference to the accompanying drawings, wherein.

DETAILED DESCRIPTION OF THE INVENTION

Figure 6:
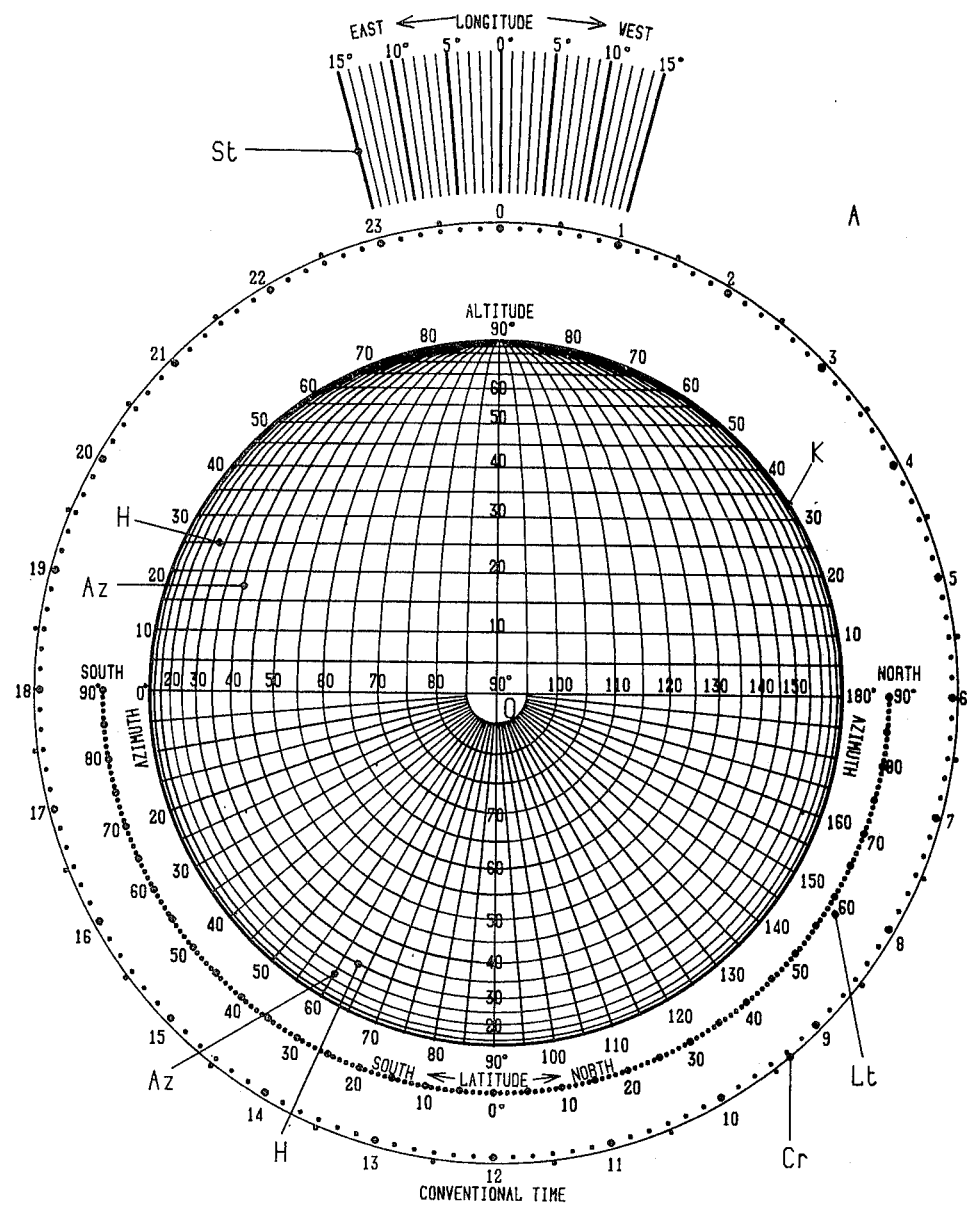
FIG. 6 is a graphic illustration of the first, fixed surface of the instrument according to the invention, resulting from a combination of FIGS. 1, 4 and 5.
Figure 7:
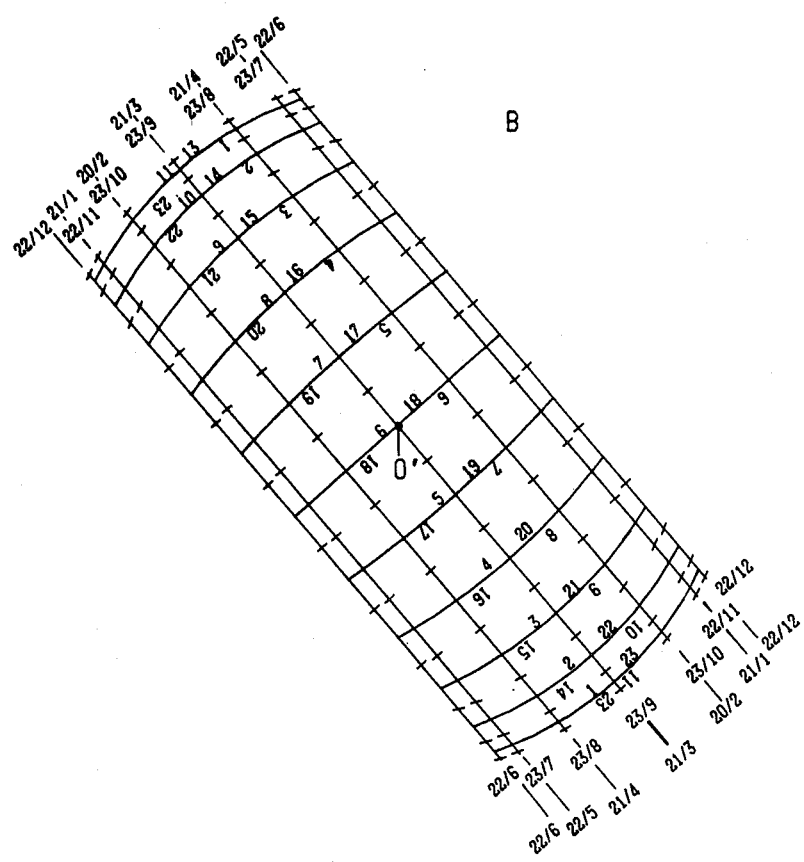
FIG. 7 is a graphic illustration of the second, rotating surface of the instrument according to the invention, resulting from a combination of the graphic constructions of FIGS. 1, 2 and 3.
Figure 8:
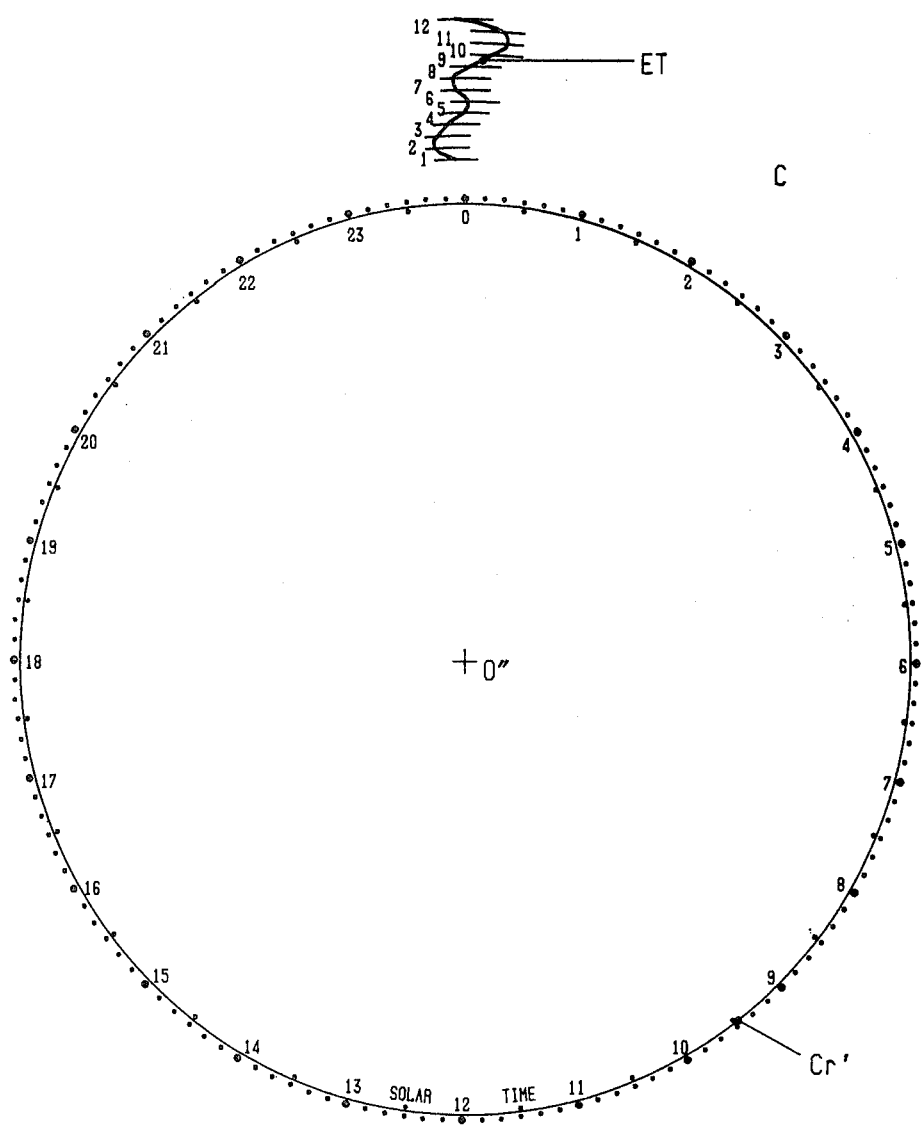
FIG. 8 is a graphic representation of a third, rotating surface of the instrument according to the invention, on which part of the graphic construction of FIG. 5 is reproduced.
Figure 9:
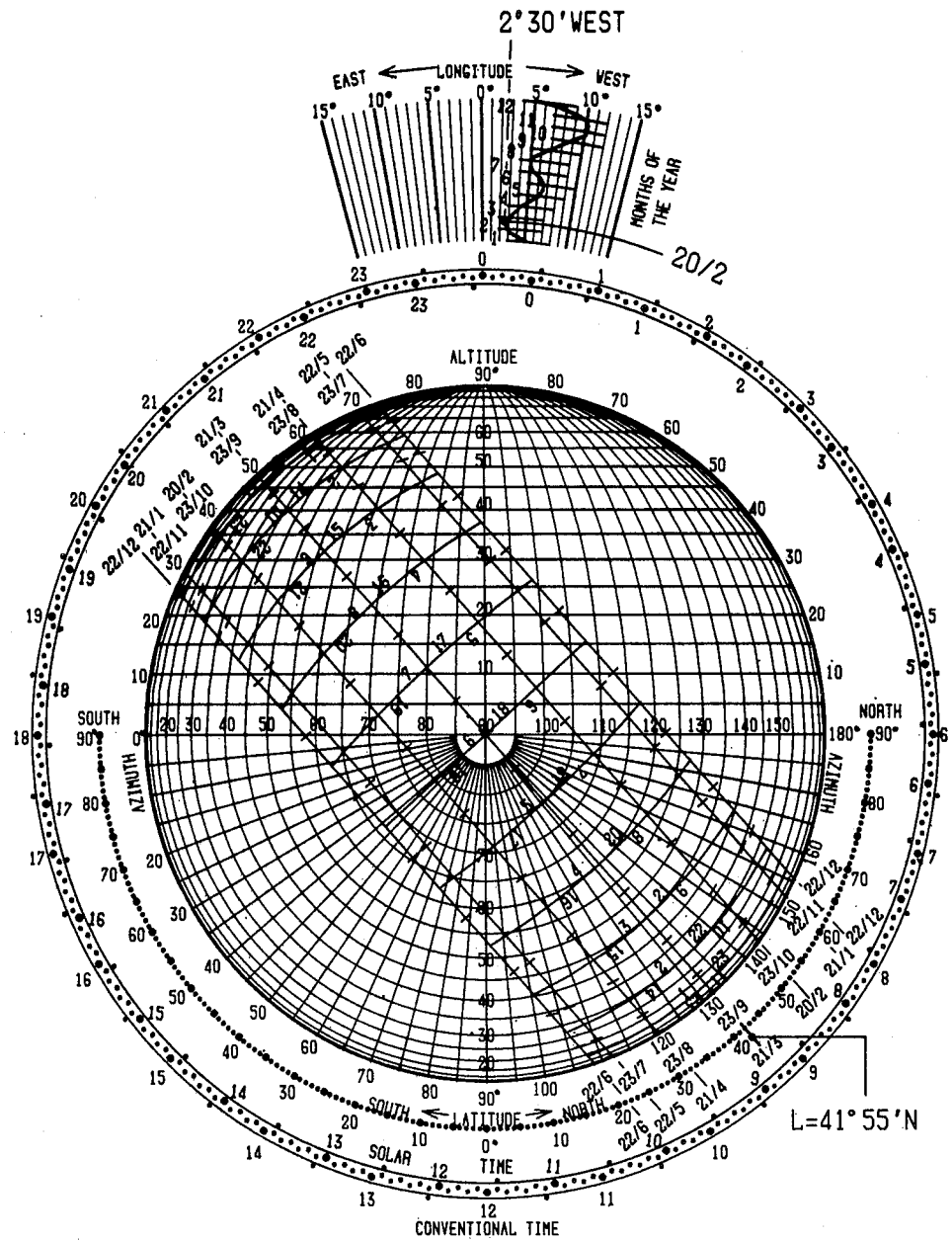
FIG. 9 is a schematic representation of the instrument according to the invention, composed of the surfaces of FIGS. 6, 7, and 8, superimposed in an orderly fashion, set for 45°55' North latitude and 12°30' East longitude (equal to 2°30' to the West of meridian 15° E on February 20)

The instrument according to the invention thus is composed of a fixed surface or planar member A, as shown in FIG. 6, with a common fulcrum, at its center O, with the center O' of a second superimposed surface, or planar member B as shown in FIG. 7, which keeps a rotating third surface or planar member C, as shown in FIG. 8, in contact with the first.

Figure 1:
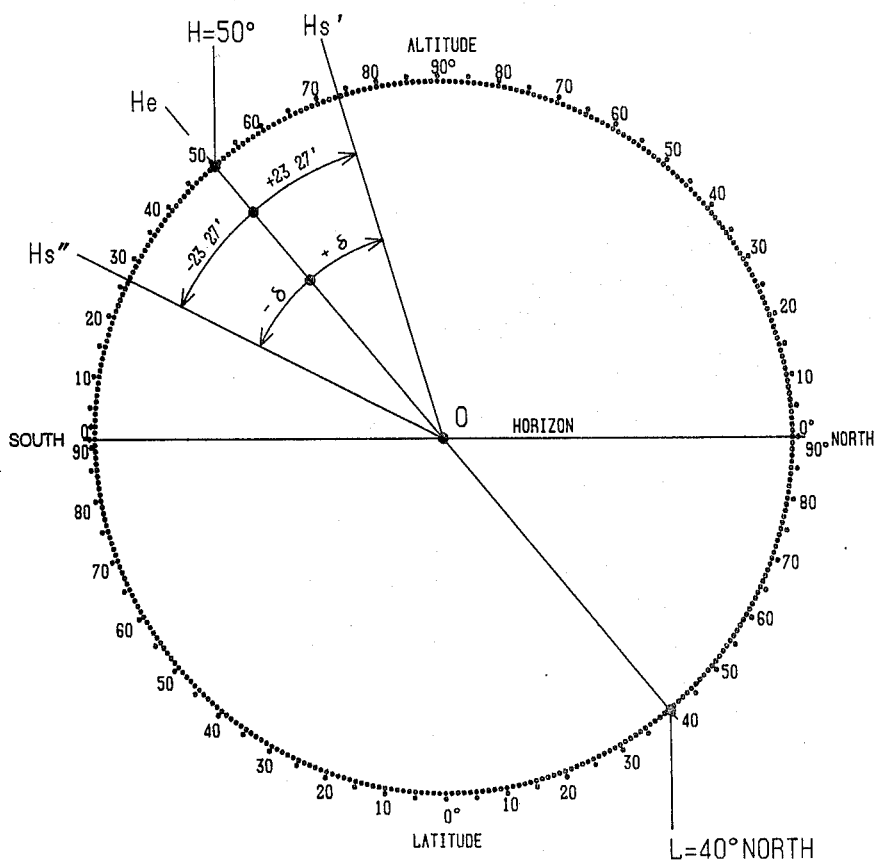
FIG. 1 is a graphic representation of a graduated circle showing altitudes and latitudes, as related to one another, forming a part of a first, fixed surface of the instrument according to the invention, with an indication explaining the declination for the construction of FIGS. 2 and 3.

On the basis of the postulates stated above, it is possible, for a given latitude, to determine graphically the altitude angles He and Hs of the sun above the horizon at its moment of culmination, on the equinox and solstice days. With reference to FIG. 1, on a straight line which represents the South-North horizon there is traced a graduated circle with its center O at an observation point which coincides with an East-West axis. The upper semicircle of FIG. 1, shows the degrees of altitude of the sun above the horizon (from 0° to the South, through 90° on a vertical passing through the observation point and 0° to the North) and the lower semicircle shows the degrees of latitude (from 90° to the South, through 0° on the vertical and 90° to the North). By tracing any diameter whatsoever, shown in FIG. 1 as He-L, a certain latitude L, 40° North in the Figure, corresponds to an angular altitude $He=90°-L$ of the sun above the horizon on the equinox days. By adding to the altitude He the solar declination angle ± delta, one determines the angular altitude Hs of the sun on the solstice days ($Hs'=He+23°27'$ on June 22 and $Hs''=He-23°27'$ on December 22).

Figure 2:
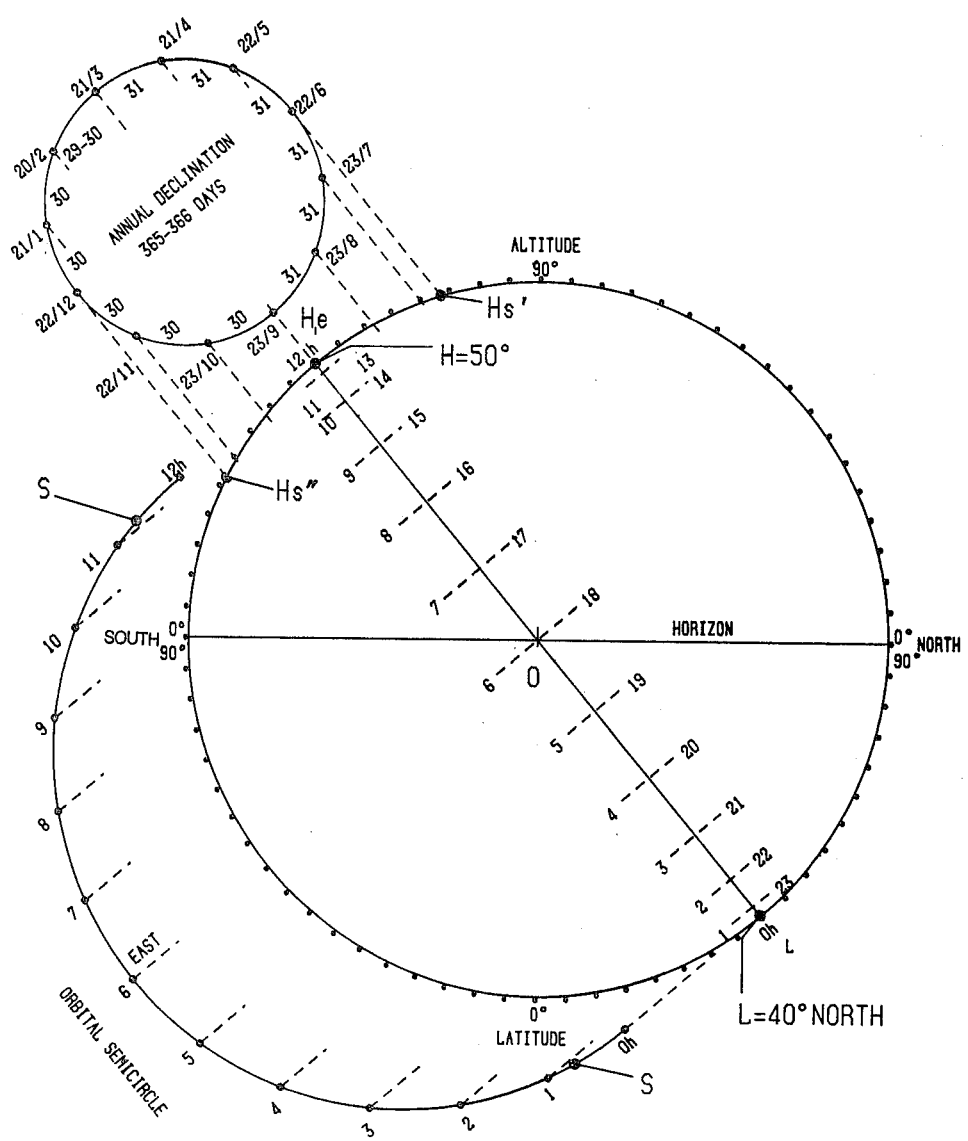
FIGS. 2 and 3 are graphic illustrations of relationships of days and months of the year and of the times in the course of the sun with reference to equinoxes and solstices of elements to be reproduced on a second, rotating surface of the instrument according to the invention.

With reference to FIG. 2, on the equinox days the sun rises in the East at exactly 6 A.M. (local time), reaches its culmination at 12 noon to the South and sets at 6 P.M. in the West. The solar orbit, at any point on the Earth, appears as a semicircle with its center at the observation point. The diameter He-L represents the circular orbit as seen from the East. By tracing the orbital semicircle S in an orthogonal projection, the daily time is subdivided into fractions. This subdivision, reproduced on the diameter He-L, identifies the apparent position of the sun, as seen from the East, at the various hours on the equinox days and for the latitude under consideration. FIG. 2 shows A.M. and P.M. times reproduced in projections along the diameter He-L.

Points Hs' and Hs'', showing the altitude of the sun on the solstice days, represent the moments of maximum and minimum declination of the annual terrestrial orbit (the orbit is slightly elliptical and the sun is at one of the foci with a minimum distance on January 16 and maximum distance at the end of June). The declination varies as a function of the annual ellipsis, which is shown in FIG. 2 on a horizontal projection; it is subdivided into fractions of a year, which, reproduced on the part of graduated circle, determine the angular altitude of the sun above the horizon at the time of culmination on the days indicated and at the latitude under consideration.

In FIG. 2, the year of 365/366 days has been subdivided into twelve parts of thirty-one days each for the period from 3/21 to 9/23 and of thirty days each from 9/23 to 3/21 (29 days from 2/20 to 3/21 in non-leap years). The subdivisions do not comprise the same number of days because of the slightly off-center position of the sun relative to the elliptical orbit.

Figure 3:
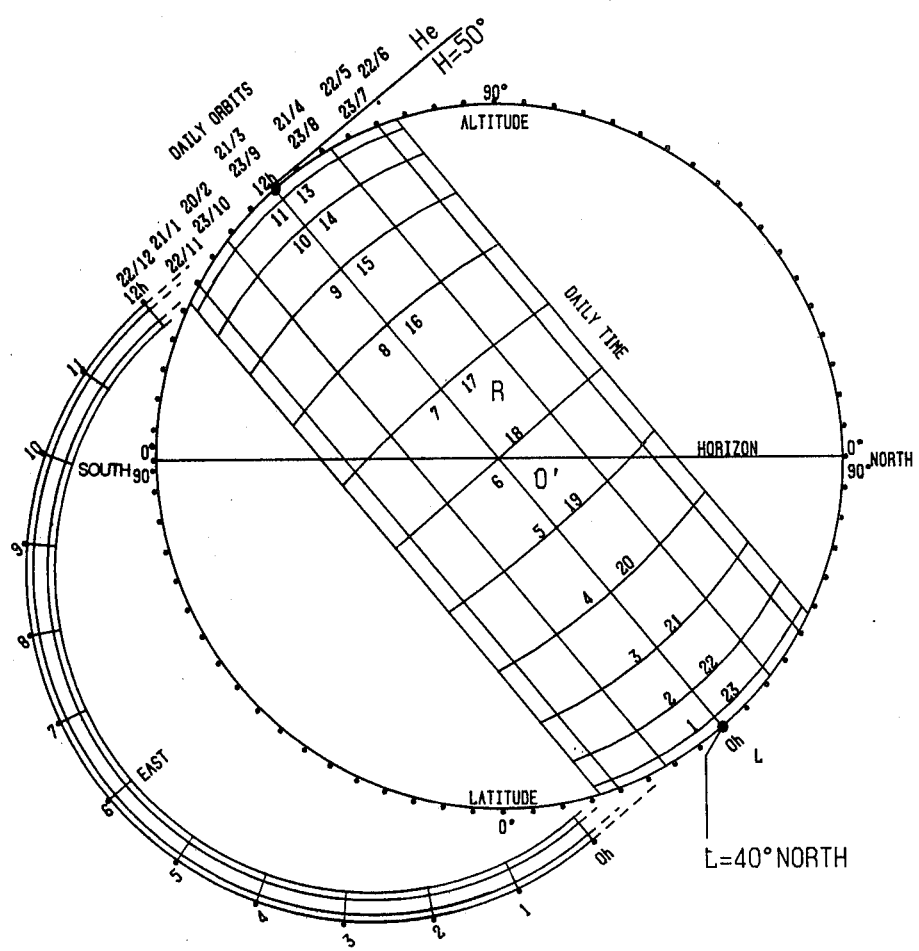

The angular altitudes marked in FIG. 2 correspond to 12 noon (local time) on the corresponding days. With reference to FIG. 3, and remembering that the axis of the Earth always remains parallel, one traces, from the points indicating the dates, parallel to the diameter He-L, lines which cross the entire graduated circle and represent the various orbits on the corresponding days. Such lines are subdivided, on an orthogonal projection, into daily time fractions, as was done in the case of the diameter He-L, and subsequently the points indicating the same time are connected.

On the grid thus obtained, the meeting point between the parallel lines and the horizontal diameter S-N in the graduated circle determines the solar sunrise and sunset time on the days and at the latitude under consideration. In order to know the data related to another latitude, it is necessary to rotate the grid, causing the diameter He-L to coincide with the new value of L.

It follows that it is necessary to print the grid R (FIG. 3) on a different surface and capable of rotating, pivoting on the center O of the graduated circle (FIG. 1) at its central point O', corresponding to the meeting point between the diameter of the equinox days and the 6 A.M./6 P.M. line.

Figure 4:
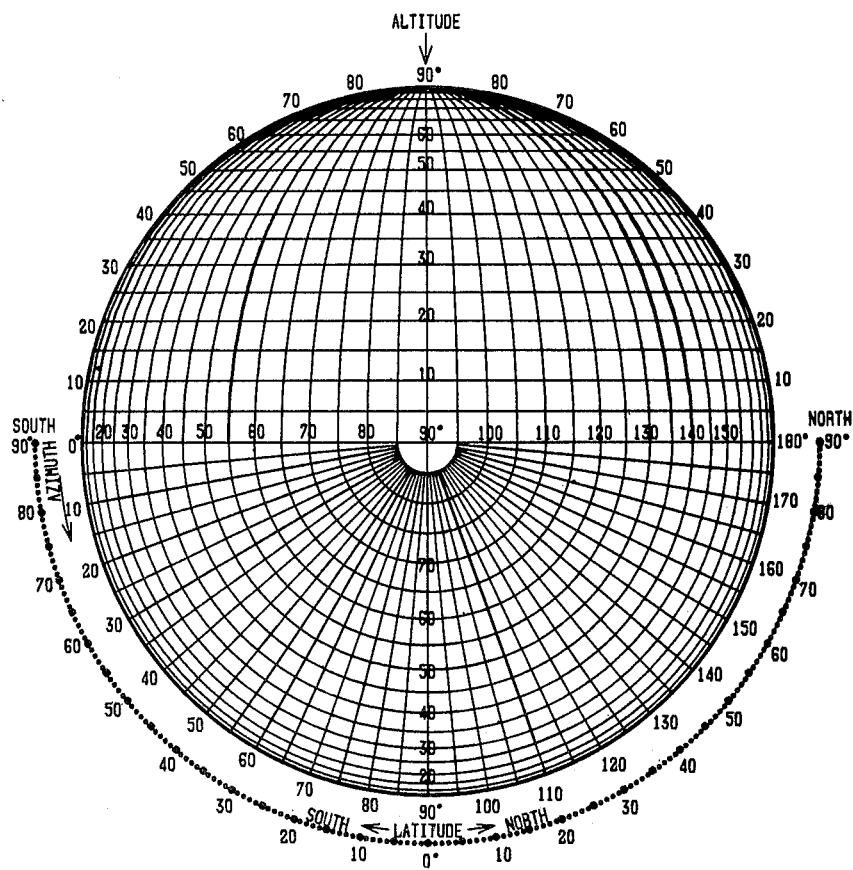
FIG. 4 is a further partial graphic representation to be reproduced on the first, fixed surface of the instrument according to the invention, with horizontal parallel lines showing altitude graduations and elliptical segments showing azimuth graduations in the upper part of the drawing, and with the orthogonal projection of such lines and segments on the lower part of the drawing.

The grid represents the spherical segment comprising the apparent solar orbits. With reference to FIG. 4, and causing the grid to rotate on point O, it generates, in the upper half above the horizontal diameter of the graduated circle, a spherical cap in which all points can be identified in terms of angular altitude above the horizon and angular distnce (azimuth) relative to the South on the South-North horizontal plane. Then, on the upper graduated semicircle, one traces the parallel lines of the altitude graduation and the elliptical segments of the azimuth graduation of the spherical cap, from 0° to the South to 180° to the North. By orienting the grid in FIG. 3 on the latitude under consideration, it is thus possible to measure the position of the sun relative to the observation point and at any time of the year selected on the grid, in terms of angular altitude above the horizon and azimuth distance from the South.

Again with reference to FIG. 4, for the purpose of graphically representing the curves of the course of the sun, an orthogonal projection of the subdivisions of the spherical cap (in its half facing East) is traced on the lower half of the graduated circle.

Thus, it will be possible to represent the points of the daily orbit of the sun, identified by their corresponding altitude and azimuth angles, on the upper half. By connecting those points, one obtains the A.M. half of the solar trajectory as seen from above. The other half is symmetrical.

Solar panels are currently used which are placed with their base side, fixed and horizontal, in an East-West direction. There are also panels which are equipped with a daily rotating mechanism, operating in an East-West direction, in order to be constantly facing the sun. In both these cases, the azimuthal position of the sun is irrelevant, precisely because either the panel is fixed in an East-West direction, or it can independently rotate at the same angular velocity as the sun. It is necessary, however, to determine the angular altitude (inclination) of the panel relative to the horizon, measured on the vertical plane located in a North-South direction, which must be perpendicular to the projection (on the same South-North vertical plane) of the sunbeams falling on the point under consideration.

Actually, the South-North vertical plane passing through the observation point is the surface shown in FIG. 3, but the part above the horizon is already being used for determining the azimuth values. On the lower part, which is identical and rotated by 180°, it is possible, however, to indicate the days and hours in an opposite direction to that shown on the upper part (FIG. 7). Furthermore, it should be noted that the lower part of the graduated circle in FIG. 4 shows radial lines which, from the observer's viewpoint O, project outside toward the latitude scale, and that such scale shows the complementary angles to the altitude of the sun.

If one superimposes the rotating and transparent surface B in FIG. 7 onto the fixed surface A in FIG. 6, one determines, on the lower part, the meeting point between the parallel line of the day under consideration and the elliptical line of the hour under consideration, which point, projected radially onto the latitude scale, corresponds to the ideal inclination of the panel relative to the horizon at the time and latitude under consideration. If a constant change in the inclination of the panel is not practically feasible, it is desirable to intervene, from time to time, identifying, by the procedure described above, the maximum and minimum angles of inclination corresponding to the period under consideration, and positioning the panel at the mean inclination (appropriately taking into account the higher intensity of solar radiation during the midday hours).

The instrument according to the invention is based on the position of the sun and the time data related to any latitude are shown in terms of true local time and are valid for all places located at the same latitude. Local noon, however, is simultaneous for all places located at the same longitude, but is different as the latter changes.

The Earth is divided into 360° of longitude (180° to the East and 180° to the West of the Greenwich 0 meridian) and local time varies by 4 minutes each degree and by one hour every 15°.

Figure 5:
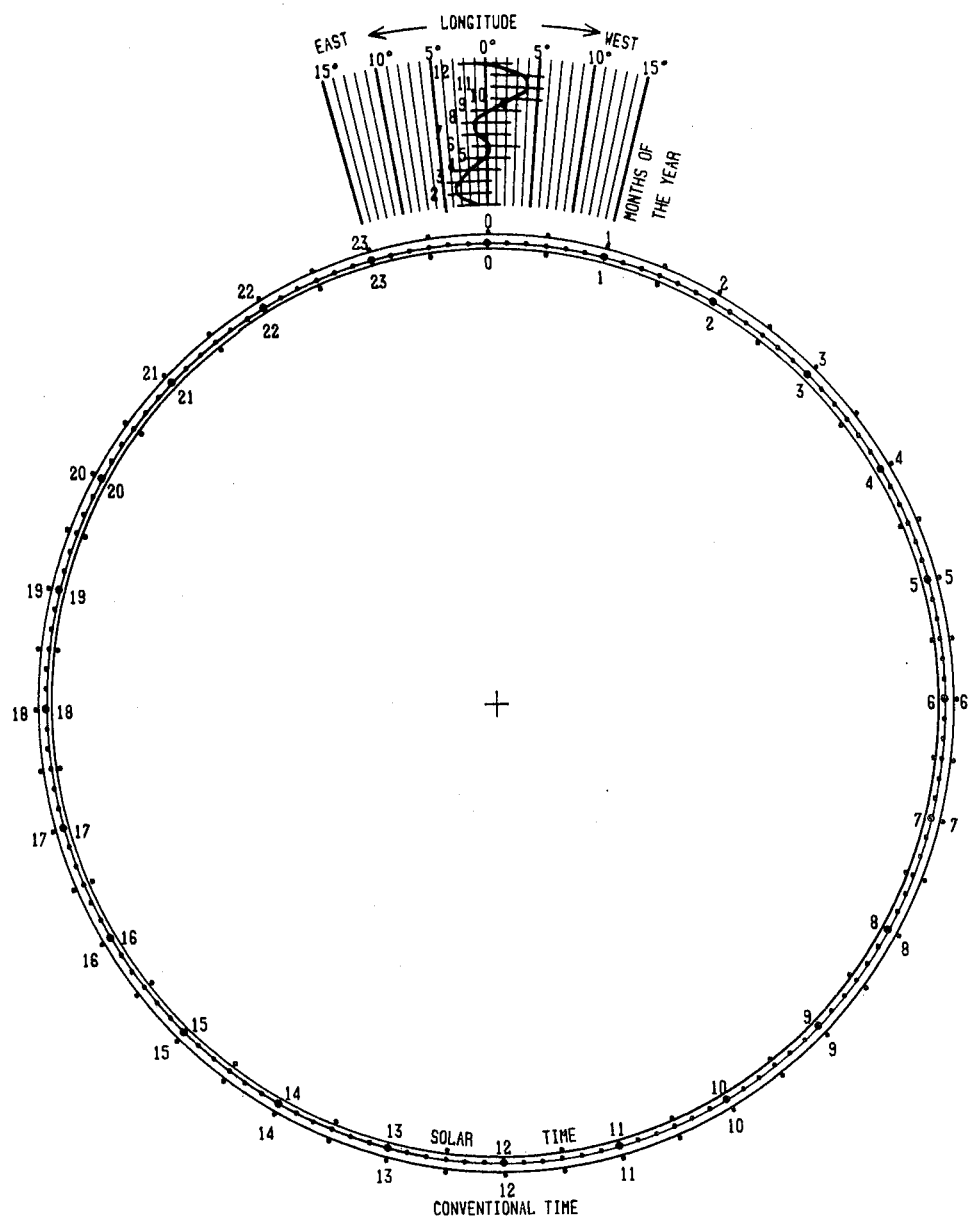
FIG. 5 is an explanatory combined graphic representation of two concentric rings with data concerning daily time fractions, with a sector divided into degrees of longitude and with a graphic representation of the time equation curve.

Furthermore, the Earth is divided into 24 time zones of 15° each (the 0 meridian is in the middle of the Greenwich time zone), and conventional time refers to the central meridians of the 24 time zones. In order to translate solar time into conventional time, it is necessary to modify it according to the difference in longitude between the place under consideration and the central meridian of the time zone to which the time shown by the clock refers. In the instrument according to this invention, this operation takes place by dividing two rings (FIG. 5) into the same daily time fractions and by rotating them one above the other by an angle equal to the longitude difference, which is found on a graduated sector, also concentric, showing at least 15° East and 15° West from the reference meridian.

The reference index of the graduated sector consists of a curved line for the following reason. Obviously, the angular velocity of the hands of a clock is constant and shows the mean time, whereas the Earth, which follows an elliptical orbit, has a variable angular velocity. Mean time differs from true time by an amount which varies during the course of the year (from +16 to −15 minutes), according to the so-called time equation, shown by the curve in FIG. 5 superimposed onto the graduated sector.

Surface A (fixed) of the instrument according to this invention will have (FIG. 6) ring Cr showing conventional time and a graduated longitude sector St, and the third surface C, which will be rotatable and transparent (FIG. 8), will have a ring Cr' showing solar time and a reference index for the graduated sector consisting of the time equation curve ET.

The upper semicircle of surface A has straight, parallel altitude lines H and elliptical azimuth lines Az intersecting lines H. The lower semicircle of surface A has orthogonal projections of lines H and Az. Lines H and Az are defined by a circle K. On a lower semicircumference Lt are shown south and north latitude values.

By rotating the rotatable ring (surface C), so that the point of intersection of the dash indicating the month under consideration with the time equation curve ET coincides with the value of the longitude difference from the place considered to the reference meridian, one determines the correspondence between conventional clock time (surface A, fixed, FIG. 6) and solar time (surface C, rotatable, FIG. 8).

As mentioned above, the instrument according to this invention is physically composed of a reference plane (surface A, fixed, FIG. 6), on the center O of which there is pivoted a rotatable disk of transparent material (surface B, rotatable, FIG. 7), around which a ring of transparent material (surface C, rotatable, FIG. 8) can rotate. The whole is graduated according to the operating criteria described above, which have been schematically summarized in the corresponding figures shown. It is preferable to make the device of rigid material, capable of withstanding without deformation the wear and tear on the central pivot and enabling the rotatable disk B to hold the ring C in contact with the reference surface A. It is also desirable to differentiate the various graduations by printing them in different colors. In addition to the clearness of the printed signs, the accuracy of the data to be determined depends on the size of the instrument. The larger its size, the more numerous can be the subdivisions, on the round angle, of the annual and daily periods, and, consequently, the smaller will be the error of approximation in the readings of the data.

The operation of the instrument is described below with reference to FIGS. 9 and 10 and FIGS. 6, 7 and 8, which represent surfaces A, B and to C of the instrument. As an example, February 20 was selected as the date for 41°55' North lat. and 12°30' East long. (equal to 2°30' West with reference to the 15° East meridian, to which time refers in Italy). It was a day indicated by the instrument for the sake of simplicity. However, a different date could be determined by interpolation, bearing in mind that solar declination is already implicit in the tracing of the days on the instrument. One should also consider that, in view of the small size of the graphs, and, consequently, in view of the scarcity of references, the values determined must be accepted with an adequate margin of tolerance.

Disk B is thus rotated until line E of the equinox days in grid R coincides with latitude $L=41°55'$, marked on surface A. The solar sunrise and sunset times, during the entire year, are determined (FIG. 10, upper part) by the meeting point between the lines showing the days and the S-N horizon line. On February 20, the intersection point of line G of that day with the horizon line shows, by approximation between the hour line T 7-17 and the hour line T 6-18, that the sun rises at 6:40 A.M. and sets at 5:20 P.M. The azimuth line Az 1, which meets the horizon at the same point, shows a value of ±75°.

In order to determine the altitude and azimuth angles, in the course of the year and at the various solar times, one determines the intersection point of line G of that day at the common intersection point between the altitude lines H and the azimuth lines Az. Such data are always found by combining the operation of surface B with surface A in FIG. 6.

The following table shows the angles for February 20:

| SOLAR TIME | ALTITUDE | AZIMUTH |
| --- | --- | --- |
| 6:40/17:20 | 0° | +75° |
| 7:00/17:00 | 3° (line H1) | +72° (line Az 1) |
| 8:00/16:00 | 13° (line H2) | +62° (line Az 2) |
| 9:00/15:00 | 22° 30' | +48° |
| 10:00/14:00 | 30° | +33° |
| 11:00/13:00 | 35° | +16° |
| 12:00 | 37° | +0° |

Figure 10:
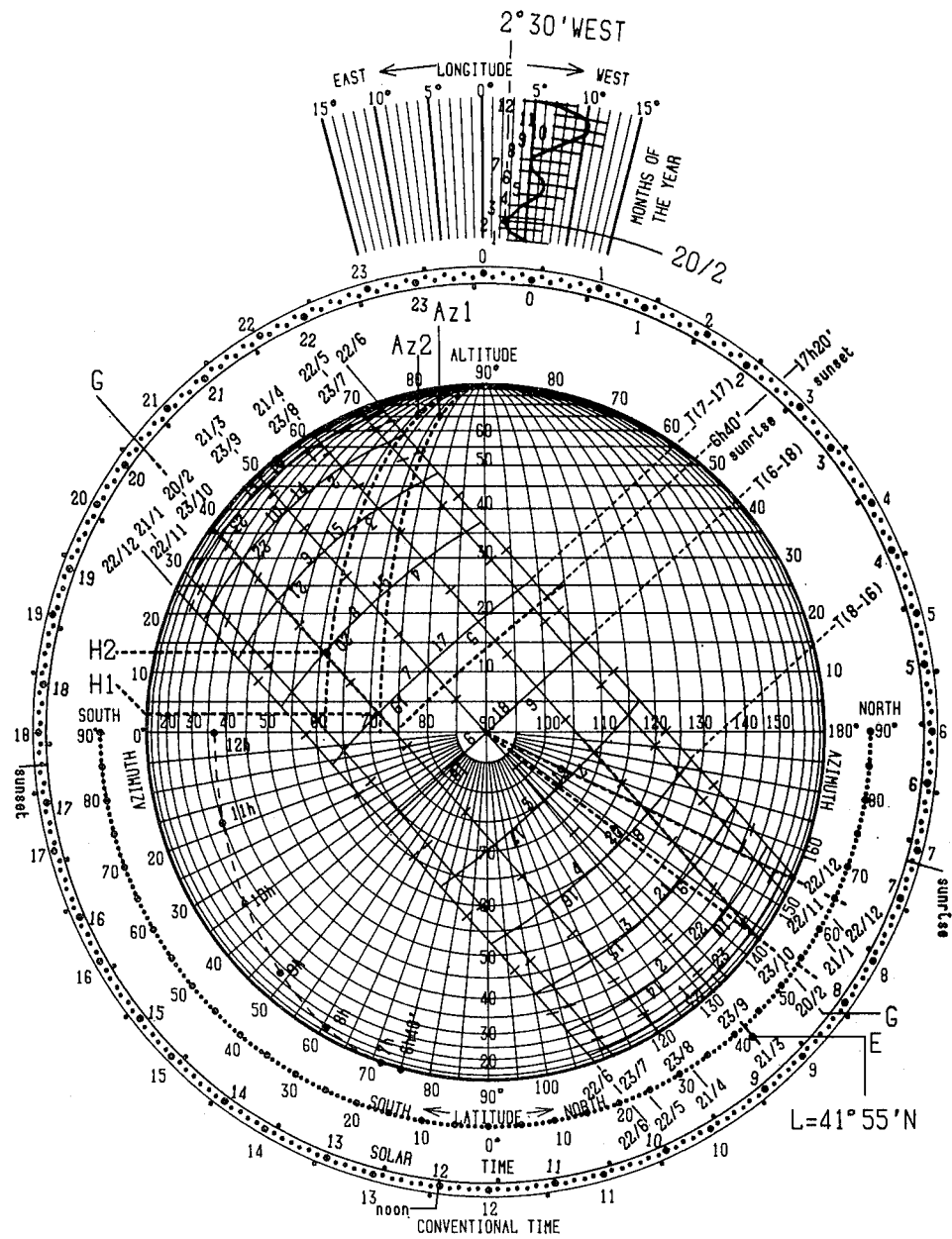
FIG. 10 is a graphic indication, by way of example, of values that can be determined from the instrument set as in FIG. 9.

The points for tracing the curves of the daily course of the sun are determined by writing the pairs of azimuth and altitude values found in the upper half on a transparent sheet superimposed onto the lower half of the instrument. By connecting the points found, one obtains the morning solar trajectory, seen from above, as shown in FIG. 10.

The optimum inclination relative to the horizon of a panel placed in a South-North direction in order to enjoy maximum insolation over a given time period is found as described below. Assuming, for the sake of simplicity that the period is that between 8 A.M. and 4 P.M. on February 20 (but it might even include several days), one finds the point, in the lower semicircle, corresponding to the intersection between the straight line G of the day and the elliptical line of T8-16 hours (shown upside down). Following the radial line originating from the center of the instrument and passing through the point thus found until it reaches the latitude scale, one determines the 65° angle, which constitutes the ideal inclination of the solar panel at 8 A.M. and 4 P.M. on February 20, at 41°55' North latitude. Again in the lower semicircle, one finds that line G intersects other radial lines up to 12 noon (culmination). From this point, as shown in FIG. 10, one projects the center angle up to the latitude scale, where a value of 54° is found. This is the ideal inclination at 12 noon and is the minimum one during the period under consideration. The optimum (mean) inclination is 59°30'.

The correspondence (FIG. 9) between the solar time shown by the rotatable ring C and the conventional time shown on the fixed surface A is determined (holding circle B motionless if an immediate transformation of the solar times found is necessary) by rotating ring C relative to surface A until the intersection point of the dash showing the month under consideration or, by approximation, the date, with the time equation curve is brought to coincide with the value of the difference in longitude between the place and the reference meridian. In the example shown in FIG. 10, solar time 6:40 (at sunrise) corresponds to conventional time 7:05, solar time 17:20 (sunset) corresponds to conventional time 17:45, solar time 12:00 (noon) corresponds to conventional time 12:25. Of course, all these values refer to February 20 at 2°30' West longitude with reference to the 15° East meridian.

The instrument according to the invention has been described and illustrated with reference to a preferred embodiment. Of course, changes will be possible in proportions, size and arrangements, without thereby exceeding the scope of the invention.

I claim:

1. An instrument for determining the position and course of the sun, the inclination for maximum insolation of a planar surface, and the relationship between solar time and conventional time, said instrument comprising:
   a fixed first planar member having a center and a surface having thereon, concentrically with respect to said center:
      a circle;
      a straight line passing through said center and dividing said circle into first and second semicircles, said straight line being representative of the horizon;
      said first semicircle having therein plural straight lines parallel to said horizon and representative of angular altitude therefrom, and plural elliptical lines intersecting said plural straight lines and representative of angular azimuth along said horizon;
      said second semicircle having therein an orthogonal projection of said plural straight lines and said plural elliptical lines;
      along a semicircumference outwardly of said second semicircle, indicia representative of south and north latitude values;
      along a ring outwardly of said circle, indicia representative of conventional daily time; and
      along a segment of said ring, indicia representative of east-west longitude values;
   a pivotable, transparent second planar member having a center and a surface having thereon:
      a straight line passing through said center of said second planar member and forming a median line representative of the 6AM-6PM time period;
      plural straight lines parallel to said median line and representative of the equinoxes, the solstices and days of the year therebetween; and
      plural curved lines concentric to said center of said second planar member and intersecting said plural straight lines thereof, said plural curved lines being representative of solar times of the day;
   a pivotable, transparent third planar member having a center and a surface having thereon:
      a ring having therearound indicia the same as said indicia along said ring on said surface of said first planar member and representative of solar time; and
      at a position outwardly of said ring, a curve representative of the time egation during the course of the year; and
   said first, second and third planar members being assembled for relative coaxial rotation about said respective centers, with said second planar member being positioned between and in contact with said first and third planar surfaces.

2. An instrument as claimed in claim 1, further comprising, on said surface of said first planar member, indicia representative of values of altitude and azimuth for said plural straight lines and said plural elliptical lines.

3. An instrument as claimed in claim 1, wherein said indicia representative of values of altitude are located adjacent respective ends of said plural straight lines along said first semicircle from a 0° south indicia at a first end of said horizon, sequentially to a 90° indicia at a midpoint of said first semicircle, and sequentially to a 0° north indicia at a second end of said horizon.

4. An instrument as claimed in claim 3, wherein said indicia representative of values of azimuth are located along said horizon adjacent respective said plural elliptical lines.

5. An instrument as claimed in claim 1, wherein said plural straight lines on said surface of said second planar member comprise projections, viewed from the east, of solar orbits for the days of said equinoxes and solstices.

6. An instrument as claimed in claim 1, wherein said indicia along said ring on said surface of said first planar surface comprise indicia representative of the twenty-four hours of the day.

7. An instrument as claimed in claim 1, further comprising, along said curve representative of the time equation during the course of the year, twelve lines intersecting said curve and representative of each month of the year.

* * * * *